US012521852B2

(12) United States Patent
de Swardt et al.

(10) Patent No.: US 12,521,852 B2
(45) Date of Patent: Jan. 13, 2026

(54) ROTATING POWER TOOL ASSEMBLY FOR TORQUE CONTROL

(71) Applicant: Apex Brands, Inc., Apex, NC (US)

(72) Inventors: Rolf Reitz de Swardt, Blythewood, SC (US); John Fiumefreddo, Irmo, SC (US)

(73) Assignee: APEX BRANDS, INC., Apex, NC (US)

( * ) Notice: Subject to any disclaimer, the term of this patent is extended or adjusted under 35 U.S.C. 154(b) by 0 days.

(21) Appl. No.: 18/713,494

(22) PCT Filed: Oct. 25, 2022

(86) PCT No.: PCT/US2022/047636
§ 371 (c)(1),
(2) Date: May 24, 2024

(87) PCT Pub. No.: WO2023/096718
PCT Pub. Date: Jun. 1, 2023

(65) Prior Publication Data

US 2025/0010440 A1 Jan. 9, 2025

Related U.S. Application Data

(60) Provisional application No. 63/282,764, filed on Nov. 24, 2021.

(51) Int. Cl.
*B25B 23/147* (2006.01)
*B25B 23/15* (2006.01)
*B25F 5/00* (2006.01)

(52) U.S. Cl.
CPC ............ *B25B 23/147* (2013.01); *B25B 23/15* (2013.01); *B25F 5/001* (2013.01)

(58) Field of Classification Search
CPC ........ B25B 23/147; B25B 23/15; B25F 5/001
See application file for complete search history.

(56) References Cited

U.S. PATENT DOCUMENTS 6,439,086 B1 8/2002 Bahr
2001/0052416 A1 12/2001 Wissmach et al.
(Continued)

FOREIGN PATENT DOCUMENTS

JP 2018058195 A 4/2018
JP 2020168670 A 10/2020
WO 2013187411 A1 12/2013

OTHER PUBLICATIONS

International Search Report and Written Opinion of corresponding International Application No. PCT/US2022/047636, mailed on Mar. 31, 2023, all enclosed pages cited herein.
(Continued)

*Primary Examiner* — Michelle Lopez
(74) *Attorney, Agent, or Firm* — BURR & FORMAN

(57) ABSTRACT

A rotating power tool assembly may include a rotating power tool and a torque control accessory. The rotating power tool may include a tag sensor and an electronic torque limiter operably coupled to an electric motor and a spindle. The electronic torque limiter being controllable by control circuitry to adjust a maximum torque output to the spindle. The torque control accessory may include a torque indicator tag and a visible torque value indicia. The torque control accessory being removably attachable to the rotating power tool. The torque indicator tag being configured to output a tag signal that indicates a maximum torque value associated with the torque control accessory for receipt by the tag sensor to control the torque limiter. The visible torque value indicia may also indicate the maximum torque value.

18 Claims, 8 Drawing Sheets

(56) References Cited

U.S. PATENT DOCUMENTS

| | | | | |
|---|---|---|---|---|
| 2003/0149508 | A1 * | 8/2003 | Watanabe | B25B 23/1405 73/862.23 |
| 2017/0239796 | A1 | 8/2017 | Gauthier et al. | |
| 2021/0205976 | A1 * | 7/2021 | Matei | G08B 7/06 |

OTHER PUBLICATIONS

Extended Search Report and Written Opinion from corresponding European Application No. 22899263.2, mailed Jul. 17, 2025, all pages cited in its entirety.

* cited by examiner

600

| Maximum Torque Value | Color |
|---|---|
| 3 N m | Yellow |
| 4 N m | Green |
| 5 N m | Orange |

FIG. 6

ROTATING POWER TOOL ASSEMBLY FOR TORQUE CONTROL

CROSS REFERENCE TO RELATED APPLICATION

This international application claims priority to U.S. application No. 63/282,764 filed Nov. 24, 2021, the entire contents of which are hereby incorporated by reference in their entirety.

TECHNICAL FIELD

Example embodiments generally relate to manufacturing technology, and more particularly relate to tool control and management in manufacturing environments.

BACKGROUND

In many manufacturing and assembly environments, such as automobile, aviation, and white goods assembly environments, there is a need to ensure that powered rotating tools (e.g., nutrunners, electric screwdrivers, and the like) are operating with appropriate settings (e.g., torque settings and the like) for the given task that is to be performed by a manufacturing worker using the tool. Tools operating with improper settings can create a number of problems. For example, a single tool with an improper torque setting may overtighten fasteners (e.g., bolts, screws, or the like), which may lead to damage to the product being manufactured. Additionally, such overtightening can lead to threads of the fastener becoming cross-threaded or stripped, which can reduce the securing force that fastener can apply and may lead to early failure of the fastener. Another common issue is undertightening (i.e., too low torque being applied) in which case the fastener may become loose and could fall out during use of the product. Depending on the type of product that is being manufactured, such fastener issues can reduce overall product reliability and lifespan.

Additionally, low-cost power tools, designed for the consumer market, have become more common in manufacturing facilities. Such tools often offer flexibility and easy modification with respect to settings, which can result in tools readily having incorrect settings due to user error. Moreover, use of such tools, can be problematic in a manufacturing environment because settings on the tools can be easily changed without any efficient means to know that changes to setting have occurred. As a result, supervisors and managers may be required to constantly monitor tool settings by performing spot checks of the tools. Such spot checks may require actual handling of the tool or being in very close proximity to the tool to be able to ascertain the current settings.

As such, techniques that operate to ensure that tools, for example on a manufacturing floor, are being utilized with the correct settings for a given task are highly desired. Accordingly, improvements in the area of rotating tool setting management are desired, particular to support operations in manufacturing environments.

BRIEF SUMMARY OF SOME EXAMPLES

According to some example embodiments, rotating power tool assembly is provided. The rotating power tool assembly may comprise a rotating power tool and a torque control accessory. The rotating power tool may comprise an electric motor, a spindle, control circuitry, a tag sensor, and an electronic torque limiter. The electronic torque limiter may be operably coupled to the electric motor. The electronic torque limiter may also be controllable by the control circuitry to adjust a maximum torque output to the spindle. The torque control accessory may comprise a torque indicator tag and a visible torque value indicia. The torque control accessory may be removably attachable to a housing of the rotating power tool. The torque indicator tag may be configured to output a tag signal that indicates a maximum torque value associated with the torque control accessory for receipt by the tag sensor. The visible torque value indicia may also indicate the maximum torque value. The tag sensor may be configured to read the tag signal from the torque indicator tag for provision to the control circuitry via a sensor signal. The control circuitry may be configured to determine the maximum torque value based on the sensor signal received from tag sensor, and control the electronic torque limiter to set the maximum torque output to the spindle based on the maximum torque value associated with the torque control accessory.

According to some example embodiments, a system is also provided comprising a plurality of torque control accessories for controlling a rotating power tool to output different maximum torques based on which of the torque control accessories are operably coupled to the rotating power tool. The plurality of torque control accessories may comprise a first torque control accessory and a second torque control accessory. Each torque control accessory of the plurality of torque control accessories may be configured to be removably attachable to a rotating power tool and communicate a respective maximum torque value to the rotating power tool to cause an adjustment to a maximum torque output from the rotating power tool. The first torque control accessory may comprise a first torque indicator tag and a first visible torque value indicia. The first torque indicator tag may be configured to output a first tag signal that indicates a first maximum torque value associated with the first torque control accessory. The second torque control accessory may comprise a second torque indicator tag and a second visible torque value indicia. The second torque indicator tag may be configured to output a second tag signal that indicates a second maximum torque value associated with the second torque control accessory. The first maximum torque value is different from the second maximum torque value, and the first visible torque value indicia is different than the second visible torque value indicia.

According to some example embodiments, a rotating power tool assembly is provided comprising a rotating power tool and a torque control accessory. The rotating power tool may comprise control circuitry, electronic torque limiter, and a tag sensor. The electronic torque limiter may be configured to be operably coupled to a motor of the rotating power tool. The electronic torque limiter may be controllable by the control circuitry to adjust a maximum torque output to the spindle. The tag sensor may be configured to read a tag signal from a torque indicator tag of a torque control accessory for provision to the control circuitry via a sensor signal. The tag signal may comprise an indication of a maximum torque value associated with the torque control accessory. The rotating power tool may be configured to physically, and removably, engage with the torque control accessory. The control circuitry may be configured to receive an indication of the maximum torque value from the tag sensor and control the electronic torque limiter to set the maximum torque output to the spindle based on the maximum torque value associated with the torque control accessory.

BRIEF DESCRIPTION OF THE SEVERAL VIEWS OF THE DRAWING(S)

Having thus described some example embodiments in general terms, reference will now be made to the accompanying drawings, which are not necessarily drawn to scale, and wherein:

FIG. 6 is a table correlating maximum torque values with colors according to some example embodiments;

DETAILED DESCRIPTION

Figure 1:
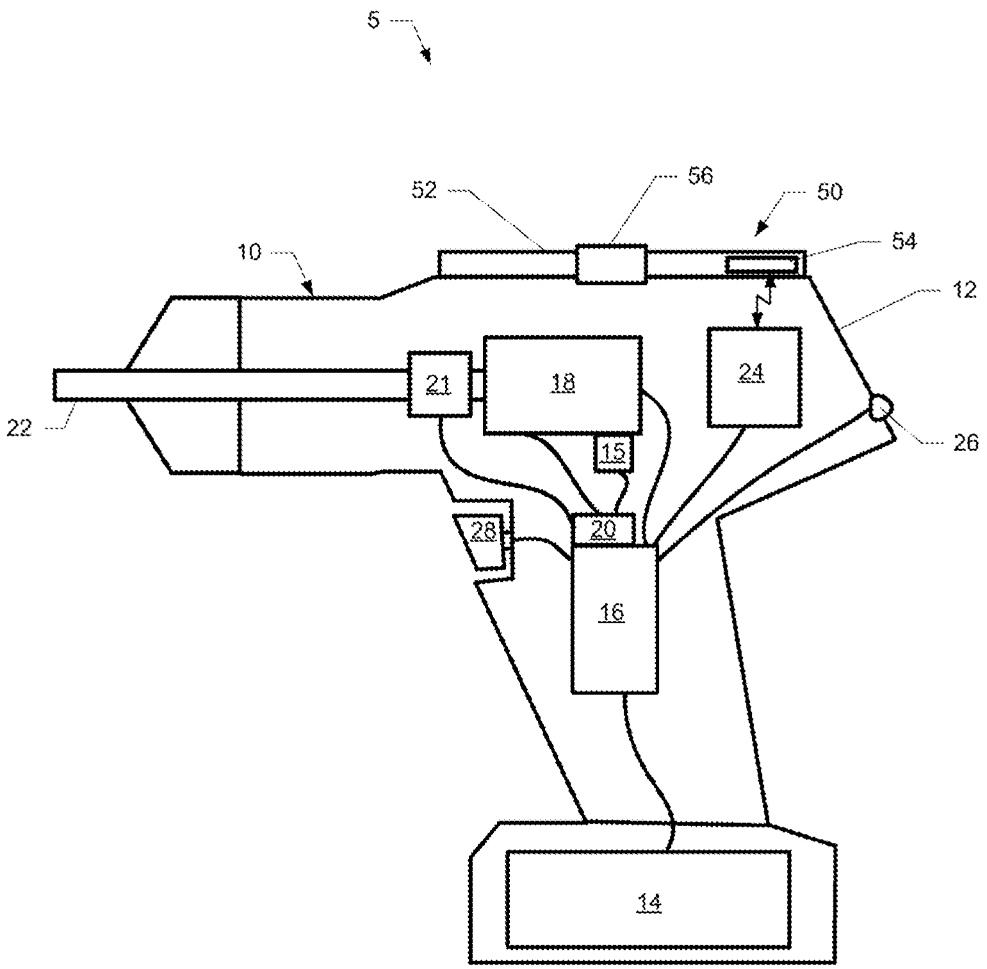
FIG. 1 illustrates a cross-sectional block diagram of an example rotating power tool assembly in accordance with some example embodiments.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

Various example embodiments described herein operate to address the technical problem of maintaining manufacturing compliance by providing tools and accessories that support such compliance. In this regard, various example embodiments operate to ensure that settings of rotating power tools can be readily determined by supervisors (e.g., visually) and changes to the settings are difficult to make or prevented, thereby avoiding improper tightening of fasteners.

In this regard, according to some example embodiments, a rotating power tool, such as a nutrunner, drill, electric screwdrivers, and the like may include torque control capabilities. The torque output by the rotating power tool may be limited, and not permitted to exceed, a maximum torque value setting of a torque limiter of the rotating power tool. As such, when a fastener is being rotated by the rotating power tool and the torque on the fastener reaches the maximum torque value (e.g., threshold), the torque limiter is configured to prevent further rotation of a drive spindle of the rotating power tool to prevent overtightening of the fastener.

As further described below, the torque limiter may be electrically controlled and may be embodied in a number of ways. According to some example embodiments, the torque limiter may be embodied in control circuitry to control the operation of an electric motor (e.g., interrupting power to or braking the motor) to discontinue rotation once a maximum torque threshold or value is reached. In this regard, according to some example embodiments, a torque sensor or torque transducer may be used to measure the torque applied to the drive spindle for provision to the control circuitry for comparison with a set maximum torque value. Alternatively, because the motor current and output torque have a proportional relationship, a current sensor may be included that measures the motor current to be used as an estimate of or proxy for the torque. As such, the current measurement may be converted into a torque value or the maximum torque value may be translated into a current value for direct comparison. According to some example embodiments, rather than controlling the electric motor to cease rotation when the maximum torque value is reached, an electromechanical torque limiter may be implemented and controlled by operating a servo, solenoid, or the like to activate a mechanical clutch or brake to prevent further rotation of the drive spindle or motor shaft when the maximum torque value is reached. According to some example embodiments, the torque limiter may be implemented as an electronically controlled slip clutch that is controlled to decouple from and recouple with the motor to perform torque control.

As such, the torque limiter, according to some example embodiments, may receive a signal indicating a maximum torque value and the torque limiter may set the maximum mechanical torque to be applied to the drive spindle accordingly. The torque limiter, which may be implemented by control circuitry, may be configured to receive the signal and control the torque provided by the drive spindle in accordance with the maximum torque value. As such, according to some example embodiments, the torque limiter may be configured to set the maximum torque value and control the torque based on a maximum torque value.

According to some example embodiments, the maximum torque value may be provided by a torque control accessory that is applied to the rotating power tool. In this regard, the torque control accessory may be a sleeve, ring, boot, or the like that can be installed on the rotating power tool. The torque control accessory may include a torque indicator tag which may be configured to output a tag signal that indicates a maximum torque value for the torque control accessory. The torque indicator tag may provide the tag signal via a wired or wireless connection to a tag sensor. The tag sensor, in turn, may provide a sensor signal that is based on the tag signal to the control circuitry, which may control and/or embody the torque limiter. The control circuitry may be configured to determine the maximum torque value from the sensor signal and control the torque limiter accordingly.

As such, a torque control accessory may be associated with a specific maximum torque value, and the torque control accessory may have a visible torque value indicia that is unique to the maximum torque value. The visible torque value indicia may comprise, for example, a color. As such, differently colored torque control accessories may have torque indicator tags storing indications for different maximum torque values. For example, a yellow torque control accessory may be associated with a maximum torque value of 3 Newton-meters (Nm) and a green torque control accessory may be associated with a 4 Nm maximum torque value.

The torque control accessories may embodied in a variety of ways. According to some example embodiments, a torque control accessory may be formed as a sleeve, ring, boot, or the like that attaches to the exterior of the rotating power tool. The torque control accessory may formed of rubber or another elastic material to permit the torque control accessory to be stretched to be wrapped around or the rotating power tool may be pushed through a flexible orifice in the torque control accessory. Once installed on the rotating power tool, the torque indicator tag of the torque control accessory may communicate the maximum torque value to the control circuitry to cause the maximum torque output of the rotating power tool to be set. Additionally, because of the coloring and visibility of the torque control accessory, according to some example embodiments, the maximum torque value that is being used by the associated rotating power tool can be readily determined from afar by visual inspection.

As such, according to some example embodiments, a rotating power tool assembly is provided that includes a rotating power tool (e.g., an electric screwdriver, nutrunner, or the like) and a plurality of different attachable torque control accessories, where each torque control accessory causes the rotating power tool to operate with a different maximum torque value. As such, each torque control accessory, according to some example embodiments, offers a single, fixed maximum permitted torque that is communicated to the rotating power tool by a torque indicator tag of the torque control accessory to control a torque limiter. Since each torque control accessory only offers a single torque control option, according to some example embodiments, once attached to the rotating power tool, there is no risk of accidentally (or purposely) changing the torque setting on the rotating power tool assembly by a manufacturing worker, without removing the torque control accessory. As such, manufacturing compliance is maintained or improved.

Additionally, each torque control accessory may include a highly visible torque value indicia that includes a visible characteristic that correlates to the maximum torque value (e.g., torque threshold) for the torque control accessory. For example, as mentioned above, the visible torque value indicia may have a color (e.g., a yellow, red, green, etc.), and the torque control accessory may cover a portion of the exterior of the rotating power tool (e.g., as a sleeve, ring, boot, or the like). The color may visually indicate the maximum torque value being employed by rotating power tool. The visible torque value indicia may be formed to be highly visible by, for example, being of a sufficient size and placement on the rotating power tool to be visible from many feet away (e.g., 10 feet or more). Accordingly, when a torque control accessory is attached to a rotating power tool, the visible torque value indicia can be used to quickly and visibly determine which maximum torque value the rotating power tool is using for operation. The visible torque value indicia therefore facilitate the ability to readily inspect and verify the maximum torque values for rotating power tools in a manufacturing environment to ensure that proper torque settings are being utilized in association with appropriate tasks. This again supports improved manufacturing compliance and uniformity by allowing, for example, a supervisor to quickly determine that a tool with an incorrect torque value is being utilized on a certain task, based on the visible torque value indicia.

In light of the above, FIG. 1 illustrates an example rotating power tool assembly 5 that comprises a rotating power tool 10 and a torque control accessory 50, according to some example embodiments. The rotating power tool 10 may comprise or be an electric screwdriver, drill, nutrunner, or the like. The rotating power tool 10 may comprise a number of components for operation, which may be disposed within a housing 12. Some example components comprise a battery 14, control circuitry 16, a motor 18, a torque limiter 20, a spindle 22, and a tag sensor 24.

The battery 14 may be an example electric power source for the rotating power tool 10. The battery 14 may allow the rotating power tool 10 to be cordless and thus easily used and manipulated without concern for the presence of a tether in the form of an electric cord. However, it is understood that example embodiments may be implemented with a rotating power tool 10 that is corded or uses a power source other than or in addition to a battery (e.g., a pneumatic source or a mains power source). The battery 14, as an electrical power source, may provide power to the control circuitry 16, the motor 18, the torque limiter 20, the tag sensor 24, and the interface device 26. The battery 14 may be rechargeable as a permanent component of the rotating power tool 10 or a removable component that may be removed and replaced with a comparable battery (e.g., that is fully charged).

The control circuitry 16 may comprise a number of electronic components that support the operation of the rotating power tool 10 as described herein. The control circuitry 16 may comprise one or more integrated circuits that include logic code (hardware or software coded) for controlling the operation of the rotating power tool 10. In this regard, the control circuitry 16 may include a processor that may be embodied, for example, as a field programmable gate array (FPGA) or an application specific integrated circuit (ASIC). Alternatively, the processor may be software programmable processing device that executes software or firmware code retrieved from a memory device. The control circuitry 16 may be configured to receive inputs and provide outputs based on the inputs.

In this regard, a control switch 28 may provide a signal to the control circuitry 16 that can be used as an input. For example, when a user depresses the control switch 28 (operating as a trigger), a signal may be provided to the control circuitry 16 as an input, and, in response, the control circuitry 16 may provide an output that permits power to be provided to the motor 18 to cause rotation of the spindle 22. Further, when the control switch 28 is released by the user, the control circuitry 16 may detect the change in the signal provided, and stop power from being provided to the motor 18. As such, the control circuitry 16 may be configured to control the operation of the motor 18.

Additionally, the control circuitry 16 may be configured to control an interface device 26. According to some example embodiments, the interface device 26 may be a light (e.g., light emitting diode (LED)) that may be controlled to provide information to the user about the operation of the rotating power tool 10. In this regard, according to some example embodiments, the control circuitry 16 may control the interface device 26 to illuminate in different colors based on operating conditions for the rotating power tool 10 (e.g., battery power low—needs charge, battery at full charge, an internal error, or the like). According to some example embodiments, the interface device 26 may comprise a display that provides, for example, various information about the operation of the rotating power tool 10 (e.g., the current maximum torque value for the rotating power tool 10).

The motor 18 may be an electric motor configured to rotate a spindle 22 to provide a rotational output for the rotating power tool 10. Alternatively, the motor 18 may be, for example, a pneumatic motor. The motor 18 may operate at a single rotational speed. However, according to some example embodiments, the motor 18 may be a dual-speed or variable speed motor, and the control circuitry 16 may be configured to receive an input (e.g., from the control switch 28) and control the operation of the motor 18 based on the functionality that the motor 18 offers. According to some example embodiments, the motor 18 may include or be operable coupled to speed reduction gearing. The speed reduction gearing may be configured to receive an input rotation at a given rotational speed and provide a rotation output (e.g., of the spindle 22) that is at a slower speed.

The spindle 22 may be rotated by the motor 18 and the spindle 22 may be the rotational output member of the rotating power tool 10. A working tip of the spindle 22 may directly or indirectly interface with a fastener or a work surface to perform an operation (e.g., a task). The working tip may therefore be a bit, for example, that is secured by, for example, a chuck, that includes a working end (e.g., a screwdriver tip, a drill bit, a socket bit, or the like) that interfaces directly with a fastener or working surface. Alternatively, the working tip may be a tang or post that a bit or socket is secured to, and the bit or socket directly interfaces with the fastener or working surface.

The motor 18 and the spindle 22 may be operably coupled to a torque limiter 20, which may be an electronic torque limiter. In this regard, the torque limiter 20 may be controlled electronically by the control circuitry 16 to set the maximum torque value and limit the output torque to the spindle 22 in accordance with the maximum torque value. As such, the electronic torque limiter 20 may be controllable by the control circuitry 16 to adjust a maximum torque output to the spindle 22. The torque limiter 20 may be embodied by the control circuitry 16 and may be configured to cause the spindle 22 to, for example, stop, disengage, or slip when a torque is applied to the spindle 22 that exceeds the maximum torque value (e.g., a threshold torque). In this manner, the torque limiter 20 may be configured to provide torque control to the rotating power tool assembly 10.

Controlling the torque applied when performing certain tasks can avoid a number of issues as described above, including damage to the product being manufactured. Without torque control, for example, fasteners could not be tightened to a uniform torque, leading to potential quality control issues. Further, torque control can ensure that fasteners are driven to a desired depth without being under-tightened (e.g., which may result in leaving exposed fastener heads or unsecured heads that permit movement and vibration) or over-tightened (e.g., which may result in the fastener passing completely through the surface attempting to be secured or the fastener becoming cross-threaded or stripped and offering decreased securing forces).

The torque limiter 20, under the control of the control circuitry 16, may therefore selectably control rotation of the spindle 22, based on whether the torque being applied to the spindle 22 does, or does not, exceed the maximum torque value. According to some example embodiments, the torque limiter 20 may be configured to implement a torque-limiting event that prevents the spindle 22 from further rotation, in response to the spindle 22 being subjected to torque, as measured by a sensor of the torque limiter 20 (e.g., a torque sensor or current sensor) in excess of a maximum torque value. An electronic torque limiter 20 may receive an input value indicative of the maximum torque value, and the torque limiter 20 may be set to that value for maximum torque output. In this regard, the torque control clutch 20 may include electromechanical components (e.g., solenoids, servos, or the like) that manipulate mechanical components to set the maximum torque value. Alternatively, the torque limiter 20 may limit torque by controlling the electrical power source to an electric motor 18 or by controlling the electric motor 18 directly. In this regard, the torque limiter 20 may comprise a torque sensor 21 that is configured to measure the torque being applied by the spindle 22. The torque sensor 21 may be configured to measure the torque on the spindle 22 and provide torque information to the control circuitry 16 to determine if a torque limiting event should occur (i.e., if the measured torque meets or exceeds the maximum torque value). Alternatively (or additionally), the torque limiter 20 may include a current sensor 15 that measures the motor current for provision to the torque limiter 20 to control the torque based on the measured motor current. Since the motor current is proportional to the torque, the motor current may be compared to a value that is a translation of the maximum torque value to determine when to trigger a torque-limiting event. The control circuitry 16 and/or the torque limiter 20 may then control the spindle 22 and/or the motor 18 accordingly.

According to some example embodiments, the torque sensor 21 may be a component of or operably coupled to the torque limiter 20 to be able to detect when the torque limiter 20 performs a torque-limiting event. The torque sensor 21, which may comprise a torque transducer, may comprise a strain gauge or use magnetostriction to obtain torque measurements. The torque control sensor 90 may be operably coupled to the spindle 22, and the torque sensor may be configured to detect when the spindle 22 is not rotating (e.g., due to occurrence of a torque limiting event). In response to determining that a torque-limiting event has occurred and detecting maintained actuation of the control switch 28 by the user, the control circuitry 16 may interrupt power delivery to the motor 18 driving the spindle 22 to reduce power waste from attempted rotation of the spindle 22 while the torque limiter 20 is preventing rotation of the spindle 22. As such, the control circuitry 16 may be configured to receive a signal from the torque sensor 21 indicating that the spindle 22 is not rotating and receive a signal from the control switch 28 indicated that the control switch 28 is actuated (e.g., depressed). In this regard, when the spindle 22 is not rotating and the control switch 28 is actuated, it may be assumed that the torque limiter 20 has performed a torque-limiting event and therefore power delivery to the motor 18 may be interrupted. Such interruption of power delivery to the motor 18 may continue until the control switch 28 is no longer actuated (e.g., released). Upon a subsequent actuation of the control switch 28, power may be delivered to the motor 18. In this regard, a battery power saving function may be implemented.

The maximum torque value for the torque control accessory 50 may be communicated via operable coupling of the torque indicator tag 54 with the tag sensor 24. The torque indicator tag 54 may provide a tag signal to the tag sensor 24 and the tag sensor 24 may read or receive the tag signal. The tag sensor 24 may provide a sensor signal to the control circuitry 16. Both the tag signal and the sensor signal may include an indication of the maximum torque value for the torque control accessory 50. The maximum torque value may be selected to be a specific torque value in, for example, Newton meters, rather than a relative torque setting amongst a number of options as provided on some adjustable torque control tools. According to some example embodiments, the maximum torque value may be changed only by removing a torque control accessory 50 and applying a different torque control accessory associated with a different maximum torque value. As mentioned above, the inability to change the maximum torque value without the effort of the removing and installing another torque control accessory prevents torque setting changes that can lead to manufacturing compliance issues.

The tag sensor 24 may be any type of communications interface that supports communication of a tag signal indicating the maximum torque value received from the torque indicator tag 54. In this regard, according to some example embodiments, the tag sensor 24 may be a plug or physical, electrical contact interface that electrically couples to the torque indicator tag 54 to receive a wired transmission of the tag signal. In such example embodiments, the torque indicator tag 54 may be a memory device, such as a read-only memory. However, according to some example embodiments, the torque indicator tag 54 may be a resistor or a capacitor, and a measurement value of the resistor (in Ohms) or the capacitor (in Farads) may indicate to the control circuitry 16, via the tag sensor 24, the maximum torque value. The rotating power tool 10 may include external contact pads that align with contacts for the torque indicator tag 54 to make the electrical, physical connection. As such, according to some example embodiments, the tag sensor 24 may be a component of, or integrated with, the control circuitry 16.

Alternatively, according to some example embodiments, the torque indicator tag 54 may be the color of the torque control accessory 50, and the tag sensor 24 may be an optical sensor (e.g., a camera or the like) that is configured to detect (or receive) an indication of the color of the torque control accessory 50 as the torque indicator tag 54. In this regard, the tag sensor 24 may detect the color of the torque control accessory 50 as the tag signal. As such, according to some example embodiments, an optical coupling of the torque control accessory 50 and the torque indicator tag 54 may be formed with the tag sensor 24 to receive the tag signal indicating the maximum torque value. According to some example embodiments, the tag sensor 24, as an optical sensor, may be positioned such that the torque control accessory 50 covers the optical sensor to ensure that the detected torque control accessory 50 is affixed to the rotating power tool 10.

Alternatively, the tag sensor 24 may support wireless communications with the torque indicator tag 54. In this regard, the torque indicator tag 54 may be a wireless communications device that communicates with the tag sensor 24 via wireless communications. The torque indicator tag 54 may comprise a radio frequency identification (RFID) tag, Bluetooth tag, or the like that is configured to transmit a wireless tag signal for receipt by the tag sensor 24. As such, the tag sensor 24 may be a receiver that includes an antenna and may operate as, for example, an RFID reader. In this regard, the tag sensor 24 may be configured to output an interrogation signal, and the torque indicator tag 54 may respond with the tag signal. Because of the close proximity of the torque indicator tag 54, the tag sensor 24 may operate at very low power, which has the benefit of operating at low range to avoid reading a torque indicator tag 54 on another, nearby rotating power tool 10. Upon receipt of the sensor signal from the tag sensor 24, the control circuitry 16 may be configured to determine the maximum torque value based on the sensor signal. The control circuitry 16 may load the maximum torque value into a memory and control the torque limiter 20 based on the maximum torque value.

As mentioned above, the torque control accessory 50 may be removable from the rotating power tool 10. In this regard, the torque control accessory 50 may engage with the exterior of the rotating power tool 10 (e.g., with the housing 12). According to some example embodiments, the torque control accessory 50 may slide over, wrap around, or otherwise be affixable to the rotating power tool 10. According to some example embodiments, the torque control accessory 50 may be removable from the rotating power tool 10 without the use of tools (e.g., by hand). Various example form factors for the torque control accessory 50 are further described below with respect to FIGS. 2-4.

According to some example embodiments, the torque control accessory 50 may be locked to the rotating power tool 10 via a locking mechanism 56. In this regard, to prevent manufacturing workers from changing the torque control accessory without approval, the locking mechanism 56 may require a key to unlock and remove the torque control accessory 50 from the rotating power tool 10. The key may be carried and controlled by a supervisor, thereby limiting or preventing access to the key by manufacturing workers that use the rotating power tool 10. As such, the key may be separate from the rotating power tool 10. The locking mechanism 56 may include a locking coupler on the rotating power tool 10 side of an engagement and a locking coupler on the torque control accessory 50 side of the engagement. According to some example embodiments, a key receiving hole may be disposed on one of either sides of the interface to allow for mechanical release of the torque control accessory 50 from the rotating power tool 10 upon engagement (e.g., insertion) of the key into the hole. According to some example embodiments, the torque control accessory 50 may latch into engagement (e.g., locked engagement) with the rotating power tool 10 upon attachment and therefore, the key may be required for removal (or detachment), but not attachment.

The torque control accessory 50 may further comprise a visible torque value indicia 52. According to some example embodiments, the visible torque value indicia 52 may be an externally visible indicator disposed on the torque control accessory 50. The visible torque value indicia 52 may comprise a visible characteristic that correlates to the maximum torque value for the torque control accessory 50. In this regard, the visible characteristic of the visible torque value indicia 52 may be a color. According to some example embodiments, the entire exterior of the torque control accessory 50 may be colored or a portion of the exterior of the torque control accessory 50 may be colored. As such, a torque control accessory 50 having a visible torque value indicia 52 that is green would have a different maximum torque value than a torque control accessory 50 having a visible torque value indicia 52 that is red. As such, the color of the visible torque value indicia 52 may be used as an indicator of the maximum torque value that is being output by the rotating power tool 10 to which it is affixed.

According to some example embodiments, the visible torque value indicia 52 may be positioned on the torque control accessory 50 at a location that is not concealed by the operator while using the rotating power tool 10. In this regard, visibility of the visible torque value indicia 52 provides substantial utility in the context of manufacturing compliance. As such, placement of the visible torque value indicia 52 on the torque control accessory 50 in a highly visible location is helpful. In this regard, for example, users of a pistol-style designed rotating power tool assembly 10 (e.g., as an electric screwdriver or nutrunner) may often hold the assembly at the trigger handle with a first hand, and then place a second hand near the working tip or chuck to control placement of the working tip. For this reason, the visible torque value indicia 52 may be placed rearward (i.e., further away from the working tip, possibly covering a main body, non-handle portion of the rotating power tool 10) to avoid the visible torque value indicia 52 being covered by the user's second, guide hand.

The visible torque value indicia 52 may positioned such that the visible torque value indicia 52 is viewable from any side of the rotating power tool 10 when applied. Further, according to some example embodiments, the visible torque value indicia 52 may also comprise light reflective features to increase visibility of the visible torque value indicia 52. In this regard, the visible torque value indicia 52 may include differing reflective features (e.g., surfaces or materials using techniques such as glass bead or micro-prismatic approaches) that permit the visible torque value indicia 52 to gleam or glimmer a certain color in certain lightings.

Figure 2:
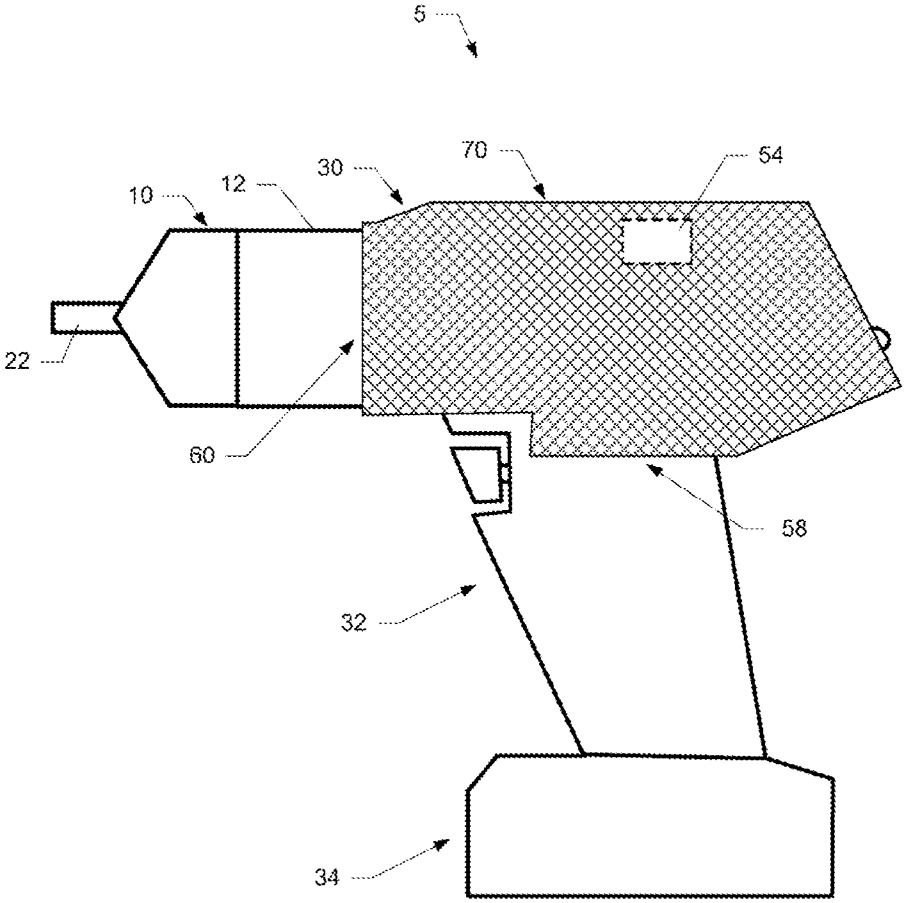
FIG. 2 illustrates an example rotating power tool assembly with a sleeve torque control accessory in accordance with some example embodiments.

FIG. 2 illustrates an example embodiment of the torque control accessory that is formed as a sleeve 70. As shown, the sleeve 70 may be formed of a flexible elastomer, such as, rubber or another elastic material, that permits the sleeve 70 to be stretched to slide onto or over the rotating power tool 10. However, according to some example embodiments, the sleeve 70 may be formed of another material, e.g., plastic, and may be affixed, for example, as two rigid clam-shell halves. The sleeve 70 may have the torque indicator tag 54 affixed to or embedded within the material of the sleeve 70, possibly in a position that is proximate the tag sensor 24. The sleeve 70 may be configured to cover the main body 30 (e.g., the portion in which the motor 18 is housed). This portion of the housing 12 may be unlikely to be covered by a user's hands when operating the rotating power tool 10 to facilitate high visibility from a distance of, for example, 10 feet or more. The sleeve 70 may include a base opening 58 that is disposed above the handle 32 when applied and a forward opening 60 through which the working tip extends. The crosshatching of the sleeve 70 indicates that the sleeve 70 is selectively colored based on the maximum torque value for the sleeve 70.

Figure 3:
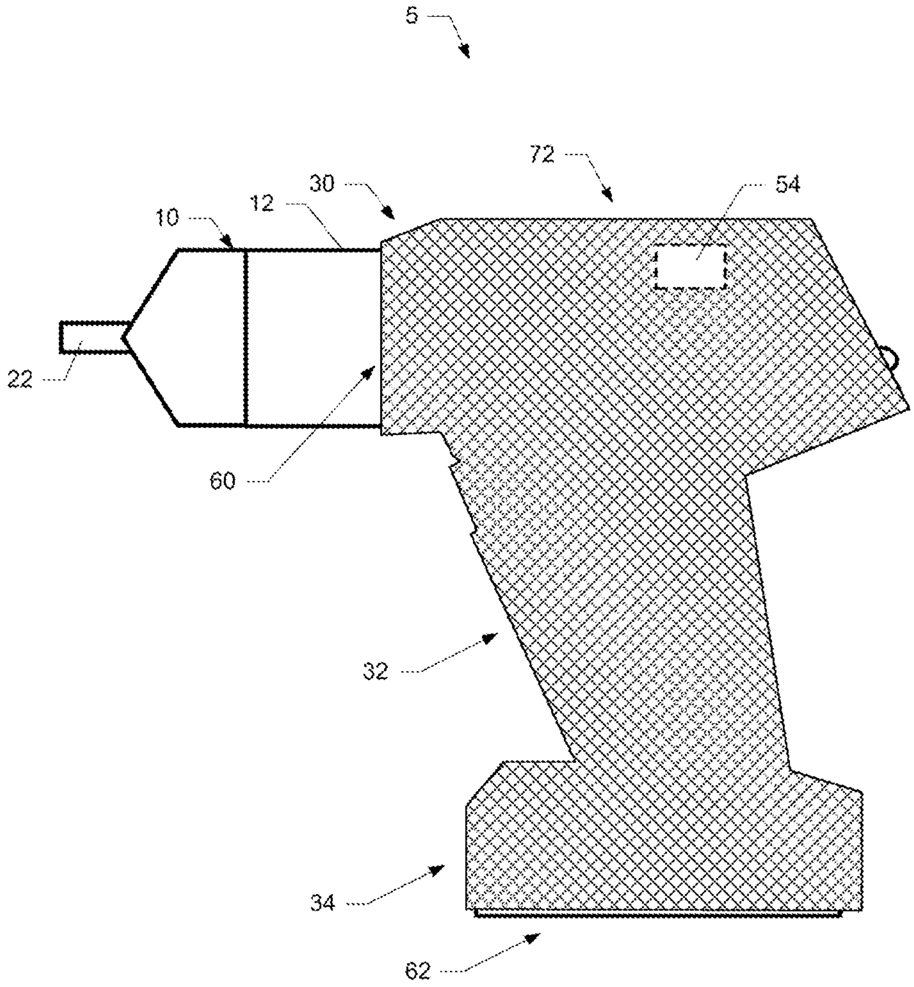
FIG. 3 illustrates an example rotating power tool assembly with a boot torque control accessory in accordance with some example embodiments.

FIG. 3 illustrates an example embodiment of the torque control accessory that is formed as a boot 72. As shown, the boot 72 may be formed of a flexible elastomer, such as, rubber or another elastic material that permits the boot 72 to be stretched to slide onto or over the rotating power tool 10. However, according to some example embodiments, the boot 72 may be formed of another material, e.g., plastic, and may be affixed, for example, as two rigid clamshell halves. The boot 72 may have the torque indicator tag 54 affixed to or embedded within the material of the boot 72, possibly in a position that is proximate the tag sensor 24. The boot 72 may be configured to cover the main body 30 (e.g., the portion in which the motor 18 is housed) as well as the handle 32. In some example embodiments, the boot 72 may also cover the battery housing 34. The boot 72 may have an opening to provide access to the control switch 28, or the material of the boot 72 may be flexible to permit a user to depress the control switch through the material of the boot 72. Because a majority of the housing 12 is covered by the boot 72, the boot 72 facilitates high visibility from a distance of, for example, 10 feet or more. The boot 72 may include a battery base opening 62 that is disposed below the handle 32 near the base of the battery housing 34 when applied and a forward opening 60 through which the working tip extends.

Figure 4:
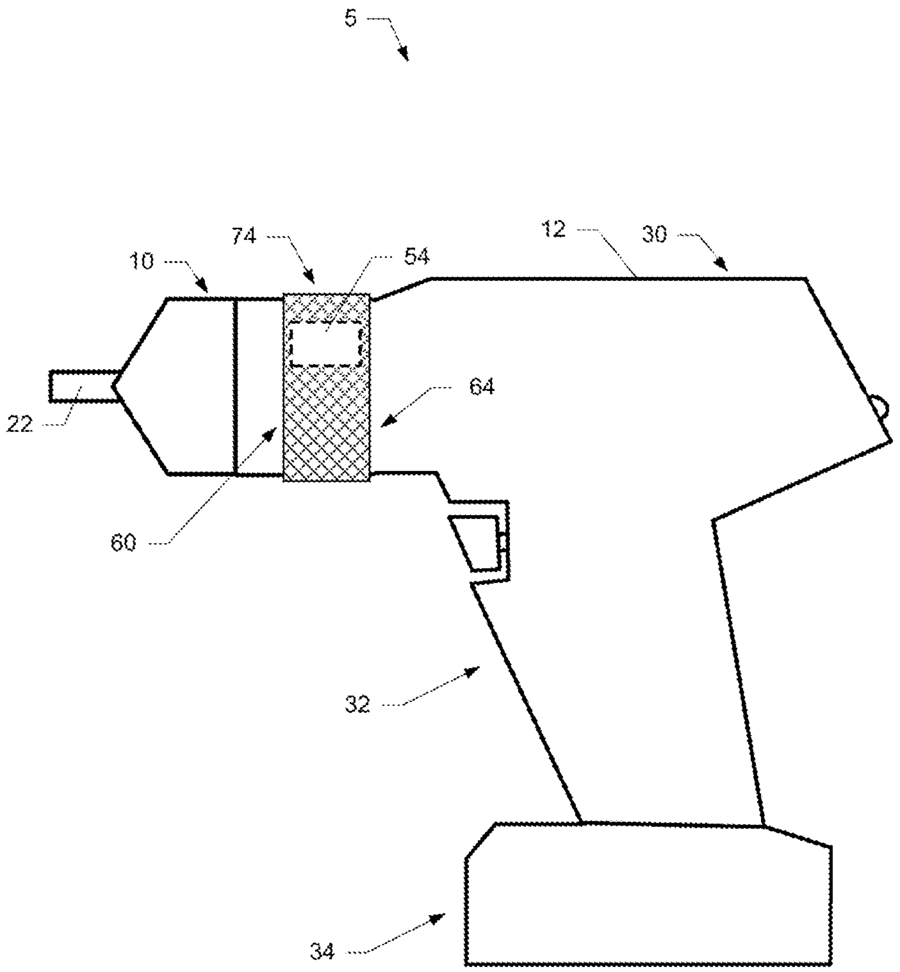
FIG. 4 illustrates an example rotating power tool assembly with a ring torque control accessory in accordance with some example embodiments.

FIG. 4 illustrates an example embodiment of the torque control accessory that is formed as a ring 74. As shown, the ring 74 may be formed of a flexible elastomer, such as, rubber or another elastic material that permits the ring 74 to be stretched to slide onto or over a portion of the rotating power tool 10. However, according to some example embodiments, the ring 74 may be formed of another material, e.g., plastic, and may be affixed, for example, as two rigid clamshell halves. The ring 74 may have the torque indicator tag 54 affixed to or embedded within the material of the ring 74, possibly in a position that is proximate the tag sensor 24. The ring 74 may be configured to cover a neck portion of the main body 30 (e.g., the portion in which the motor 18 is housed). This portion of the housing 12 may be unlikely to be covered by a user's hands when operating the rotating power tool 10 to facilitate high visibility. The ring 74 may include a rear opening 64 that is disposed rearward of a forward opening 60 that is proximate to the working tip, which extends through the ring 74. The crosshatching of the ring 74 indicates that the ring 74 is selectively colored based on the maximum torque value for the ring 74. Further, the width of the ring may be selected to increase visibility of the visible torque value indicia 52. In this regard, a width of the ring may be greater than 0.25 inches to increase visibility of the ring from a distance of, for example, 10 feet or more.

Figure 5:
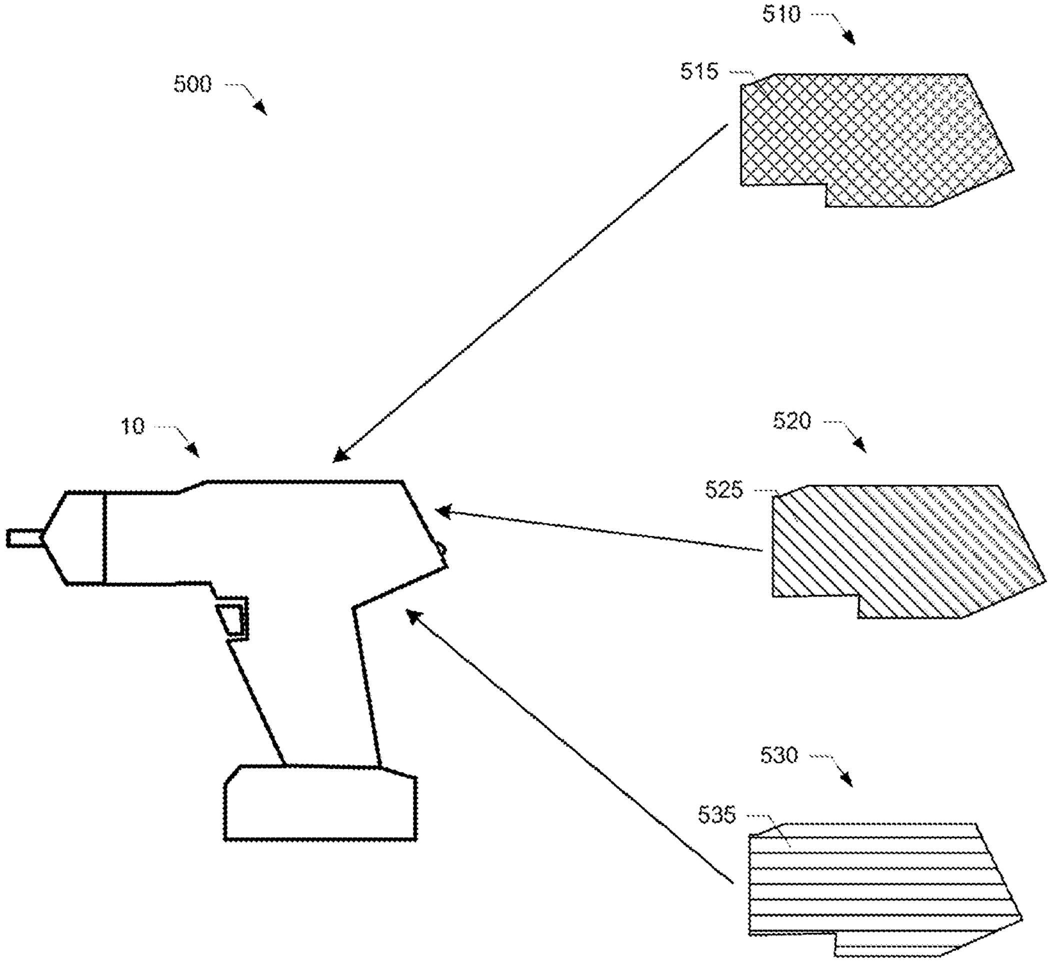
FIG. 5 illustrates an example rotating power tool assembly with a plurality of torque control accessories in accordance with some example embodiments.

Now referring to FIG. 5, a rotating power tool system 500 is shown. In this regard, the system 500 comprises a plurality of torque control accessories (shown as sleeves) that can be detachably coupled to the rotating power tool 10. The system 500 may comprise torque control accessories 510, 520, and 530, each of which may be same or similar to the torque control accessory 50 described above. However, each of the torque control accessories 510, 520, and 530 may have a torque indicator tag that indicates a different maximum torque value and therefore would also have a different visual characteristic of the their respective visible torque value indicia 515, 525, and 535. Each visible torque value indicia 515, 525, and 535 may be formed in the same or similar manner as described with respect to visible torque value indicia 52 (as well as the sleeve 70, the boot 72, or the ring 74). Further, each torque control accessory 510, 520, and 530 may be configured to be detachably coupled to the rotating power tool 10, with each torque control accessory indicating a respective maximum torque value.

According to some example embodiments, the colors and maximum torque values may be defined as provided in the table 300 shown in FIG. 3. In this regard, for example, the torque control accessory 510 with a visible torque value indicia 515 that is yellow, would have a maximum torque value of 3 N m (Newton meters). Further, the torque control accessory 520 with a visible torque value indicia 525 that is green, would have a maximum torque value of 4 N m. Finally, the torque control accessory 530 with a visible torque value indicia 535 that is orange, would have a maximum torque value of 5 N m.

Figure 7:
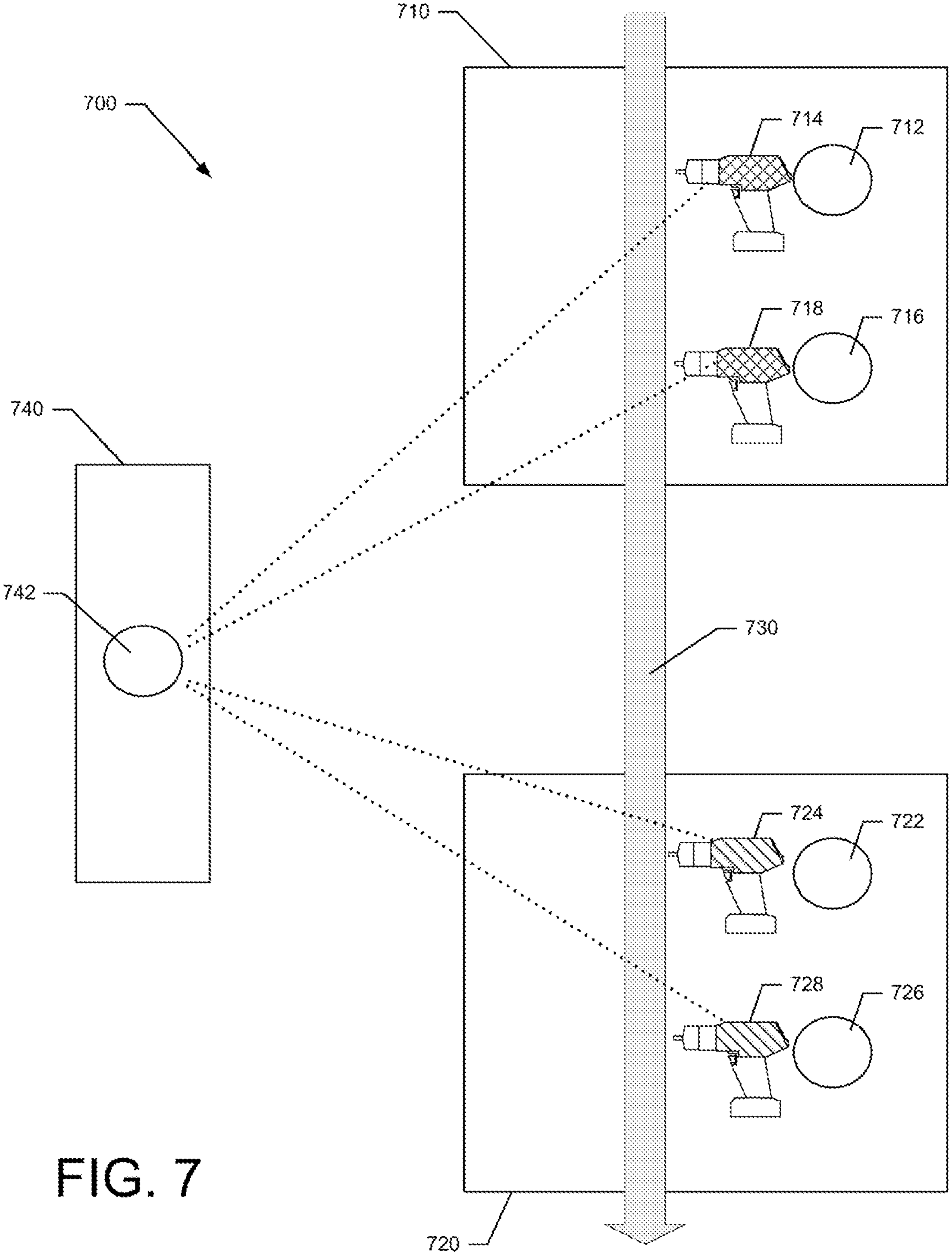
FIG. 7 shows an example manufacturing environment according to some example embodiments.

Now referring to FIG. 7, an example manufacturing environment 700 is shown. In this regard, the manufacturing environment 700 may include an assembly line 730 that passes through a manufacturing task zone 710 and a manufacturing task zone 720. A specific first manufacturing task (e.g., fastener application) may be performed in manufacturing task zone 710 that requires a certain torque. Manufacturing worker 712 is utilizing rotating power tool assembly 714 to perform a first manufacturing task in manufacturing task zone 710, and manufacturing worker 716 is utilizing rotating power tool assembly 718 to perform the first manufacturing task. Similarly, a specific second manufacturing task (e.g., fastener application) may be performed in manufacturing task zone 720 that requires a certain torque (e.g., that may be different from the first manufacturing task). Manufacturing worker 722 is utilizing rotating power tool assembly 724 to perform the second manufacturing task in manufacturing task zone 720, and manufacturing worker 726 is utilizing rotating power tool assembly 728 to perform the second manufacturing task.

A supervisor 742 is also present within the manufacturing environment 700. In this regard, according to some example embodiments, the supervisor 742 may remain in the supervisor zone 740. The supervisor zone 740 may be some distance from the manufacturing task zones 710 and 720. For example, the supervisor zone 740 may be more than 10 feet from the task zones 710 and 720, and may be up to 50 feet from the task zones 710 and 720.

However, according to various example embodiments, because of the visibility considerations of the visible torque value indicia on the torque control accessories, a supervisor 742 that is some distance away, may still be able to verify that correct torques are being applied for the first manufacturing task and the second manufacturing task. The supervisor 742 may need to simply look at the visible torque value indicia of the applied torque control accessories, as indicated by the dotted lines of sight of the supervisor 742. As such, the supervisor 742 may be able to visually verify that rotating power tools operating on the first manufacturing task have a first visible torque value indicia in compliance with a manufacturing procedure. The supervisor 742 may also be able to visually verify that rotating power tools operating on a second manufacturing task have a second visible torque value indicia. According to some example embodiments, the first manufacturing task may comprise tightening first fasteners on a product moving along the assembly line 730, and the second manufacturing task comprises tightening second fasteners on the product moving along the assembly line 730.

Figure 8:
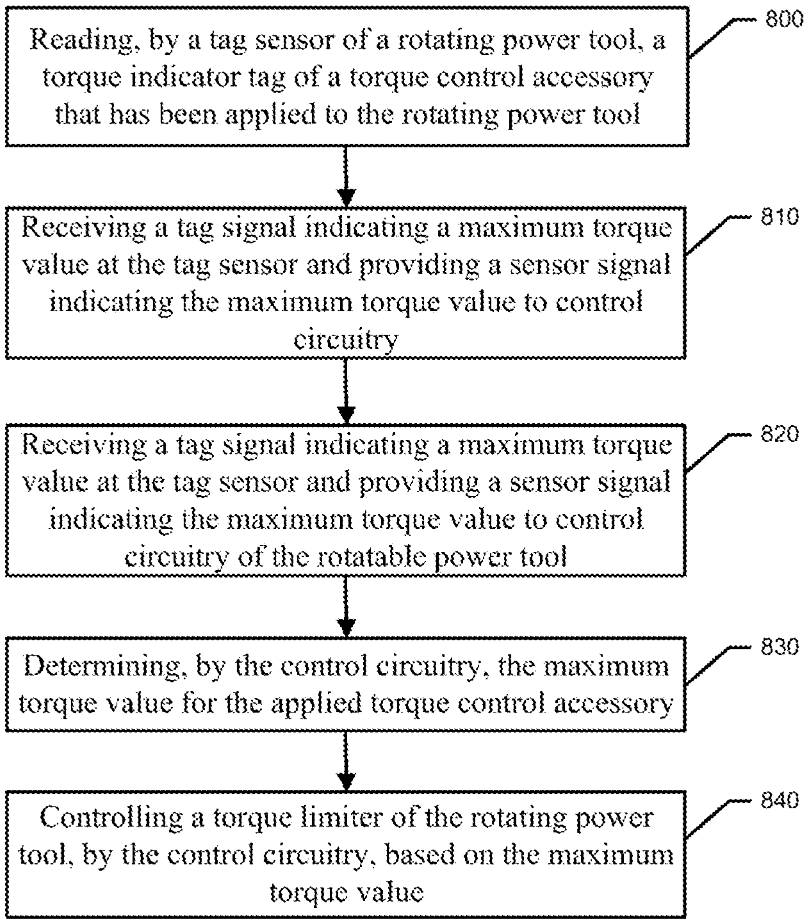
FIG. 8 illustrates a flow chart of a method for adjusting a maximum torque value according to some example embodiments.

Now referring to FIG. 8, an example method for adjusting a maximum torque value on a rotating power tool is provided. The example method comprises at 810 reading, by a tag sensor of a rotating power tool, a torque indicator tag of a torque control accessory that has been applied to the rotating power tool. At 820, receiving a tag signal indicating a maximum torque value at the tag sensor and providing a sensor signal indicating the maximum torque value to control circuitry of the rotating power tool. At 830, the example method may comprise determining, by the control circuitry, the maximum torque value for the applied torque control accessory. At 840, the example method may also comprise controlling a torque limiter of the rotating power tool, by the control circuitry, based on the maximum torque value.

In light the above description, various example embodiments have been described. Additional example embodiments are provided with reference to further combinations of the elements, features, and concepts described herein. As such, a first embodiment may comprise rotating power tool assembly that may comprise a rotating power tool and a torque control accessory. The rotating power tool may comprise an electric motor, a spindle, control circuitry, a tag sensor, and an electronic torque limiter. The electronic torque limiter may be operably coupled to the electric motor. The electronic torque limiter may also be controllable by the control circuitry to adjust a maximum torque output to the spindle. The torque control accessory may comprise a torque indicator tag and a visible torque value indicia. The torque control accessory may be removably attachable to a housing of the rotating power tool. The torque indicator tag may be configured to output a tag signal that indicates a maximum torque value associated with the torque control accessory for receipt by the tag sensor. The visible torque value indicia may also indicate the maximum torque value. The tag sensor may be configured to read the tag signal from the torque indicator tag for provision to the control circuitry via a sensor signal. The control circuitry may be configured to determine the maximum torque value based on the sensor signal received from tag sensor, and control the electronic torque limiter to set the maximum torque output to the spindle based on the maximum torque value associated with the torque control accessory. In light the above description, various example embodiments have been described. Additional example embodiments are provided with reference to further combinations of the elements, features, and concepts described herein.

As such, a first embodiment may comprise rotating power tool assembly that may comprise a rotating power tool and a torque control accessory. The rotating power tool may comprise an electric motor, a spindle, control circuitry, a tag sensor, and an electronic torque limiter. The electronic torque limiter may be operably coupled to the electric motor. The electronic torque limiter may also be controllable by the control circuitry to adjust a maximum torque output to the spindle. The torque control accessory may comprise a torque indicator tag and a visible torque value indicia. The torque control accessory may be removably attachable to a housing of the rotating power tool. The torque indicator tag may be configured to output a tag signal that indicates a maximum torque value associated with the torque control accessory for receipt by the tag sensor. The visible torque value indicia may also indicate the maximum torque value. The tag sensor may be configured to read the tag signal from the torque indicator tag for provision to the control circuitry via a sensor signal. The control circuitry may be configured to determine the maximum torque value based on the sensor signal received from tag sensor, and control the electronic torque limiter to set the maximum torque output to the spindle based on the maximum torque value associated with the torque control accessory. The example rotating power tool assembly described above may be modified, augmented, or may include optional additions, some of which are described herein. The modifications, augmentations or optional additions listed below are some examples of elements that may be added in any desirable combination. Within this context, other embodiments may be defined by each respective combination of modifications, augmentations or optional additions based on the first embodiment. For example, in a second embodiment, the visible torque value indicia of the torque control accessory may comprise a color, and the color may be associated with the maximum torque value for the torque control accessory. The second embodiment may be combined with the first embodiment, as appropriate. Additionally or alternatively, in a third embodiment, the visible torque value indicia may be positioned to be visible while the rotating power tool is in use to permit the visible torque value indicia to be visible from a minimum distance for visual checks of the torque control accessory. The third embodiment may be combined with any or all of first and second embodiments, as appropriate. Additionally or alternatively, in a fourth embodiment, the torque indicator tag may be a wireless communications device that communicates with the tag sensor via wireless communications. The fourth embodiment may be combined with any or all of first to third embodiments, as appropriate. In a fifth embodiment the torque indicator tag may be a memory device, a resistor, or a capacitor that communicates with the tag sensor via a physical electrical connection. The fifth embodiment, and the variations of the fifth embodiment, may be combined with any or all of the first to fourth embodiments, as appropriate. Additionally or alternatively, in a sixth embodiment, the torque indicator tag may be a radio frequency identification (RFID) tag, and tag sensor may be a reader configured to interrogate the RFID tag of the torque control accessory to cause a response comprising the tag signal. The sixth embodiment may be combined with any or all of first to fifth embodiments, as appropriate. Additionally or alternatively, in a seventh embodiment, the torque control accessory may comprise a sleeve or a boot that is configured to slide onto or over a portion of the housing. The seventh embodiment may be combined with any or all of the first to sixth embodiments, as appropriate. Additionally or alternatively, in an eighth embodiment, the torque limiter may comprise a torque sensor implemented with a strain gauge or magnetostriction, a current sensor to measure the motor current, or a slip clutch that is electrically controlled to decouple the spindle from the motor. The eighth embodiment may be combined with any or all of the first to seventh embodiments, as appropriate. Additionally or alternatively, in a ninth embodiment, the rotating power tool assembly may further comprise a second torque control accessory comprising a second visible torque value indicia and a second torque indicator tag configured to output a second tag signal that indicates a second maximum torque value associated with the second torque control accessory. The second maximum torque value is different from the maximum torque value, and the second visible torque value indicia is different from visible torque value indicia. The ninth embodiment may be combined with any or all of the first to eighth embodiments, as appropriate.

A tenth example embodiment is a system that may comprise a plurality of torque control accessories for controlling a rotating power tool to output different maximum torques based on which of the torque control accessories are operably coupled to the rotating power tool. The plurality of torque control accessories may comprise a first torque control accessory and a second torque control accessory. Each torque control accessory of the plurality of torque control accessories may be configured to be removably attachable to a rotating power tool and communicate a respective maximum torque value to the rotating power tool to cause an adjustment to a maximum torque output from the rotating power tool. The first torque control accessory may comprise a first torque indicator tag and a first visible torque value indicia. The first torque indicator tag may be configured to output a first tag signal that indicates a first maximum torque value associated with the first torque control accessory. The second torque control accessory may comprise a second torque indicator tag and a second visible torque value indicia. The second torque indicator tag may be configured to output a second tag signal that indicates a second maximum torque value associated with the second torque control accessory. The first maximum torque value is different from the second maximum torque value, and the first visible torque value indicia is different than the second visible torque value indicia.

The example system described above may be modified, augmented, or may include optional additions, some of which are described herein. The modifications, augmentations or optional additions listed below are some examples of elements that may be added in any desirable combination. Within this context, other embodiments may be defined by each respective combination of modifications, augmentations or optional additions based on the tenth embodiment. For example, in an eleventh embodiment, the first visible torque value indicia may comprise a first color indicative of the first maximum torque value and the second visible torque value indicia comprises a second color indicative of the second maximum torque value, and the first color is different from the second color. The eleventh embodiment may be combined with the tenth embodiment, as appropriate. Additionally or alternatively, in a twelfth embodiment, the first visible torque value indicia may be configured to be positioned to be visible while the rotating power tool is in use to permit visibility of the first visible torque value indicia from a minimum distance for visual checks of first torque control accessory. The twelfth embodiment may be combined with any or all of the tenth or eleventh embodiments, as appropriate. In a thirteenth embodiment, the first torque indicator tag may be a wireless communications device that communicates with a tag sensor of the rotating power tool via wireless communications. The thirteenth embodiment may be combined with any or all of the tenth to twelfth embodiments, as appropriate. In a fourteenth embodiment, the first torque indicator tag is a memory device that communicates with a tag sensor of the rotating power tool via a physical electrical connection. The fourteenth embodiment may be combined with any or all of the tenth to thirteenth embodiments, as appropriate. In a fifteenth embodiment, the first torque indicator tag is a radio frequency identification (RFID) tag configured to output a response signal indicating the first maximum torque value. The fifteenth embodiment may be combined with any or all of the tenth to fourteenth embodiments, as appropriate. In a sixteenth embodiment, the first torque control accessory comprises a sleeve or a boot that is configured to slide onto or over a portion of an exterior of the rotating power tool. The sixteenth embodiment may be combined with any or all of the tenth to fifteenth embodiments, as appropriate. In a seventeenth embodiment, the first torque control accessory comprises a flexible elastomer in the shape of the sleeve or the boot. The seventeenth embodiment may be combined with any or all of the tenth to sixteenth embodiments, as appropriate.

An eighteenth embodiment is a rotating power tool assembly comprising a rotating power tool and a torque control accessory. The rotating power tool may comprise control circuitry, electronic torque limiter, and a tag sensor. The electronic torque limiter may be configured to be operably coupled to a motor and a spindle of the rotating power tool. The electronic torque limiter may be controllable by the control circuitry to adjust a maximum torque output to the spindle. The tag sensor may be configured to read a tag signal from a torque indicator tag of a torque control accessory for provision to the control circuitry via a sensor signal. The tag signal may comprise an indication of a maximum torque value associated with the torque control accessory. The rotating power tool may be configured to physically, and removably, engage with the torque control accessory. The control circuitry may be configured to receive an indication of the maximum torque value from the tag sensor and control the electronic torque limiter to set the maximum torque output to the spindle based on the maximum torque value associated with the torque control accessory.

The example rotating power tool assembly described above may be modified, augmented, or may include optional additions, some of which are described herein. The modifications, augmentations or optional additions listed below are some examples of elements that may be added in any desirable combination. Within this context, other embodiments may be defined by each respective combination of modifications, augmentations or optional additions based on the eighteenth embodiment. For example, in a nineteenth embodiment, the torque control accessory may comprise a visible torque value indicia that comprises a color, and the color may be associated with the maximum torque value for the torque control accessory. The nineteenth embodiment may be combined with the eighteenth embodiment, as appropriate. In a twentieth embodiment, the torque indicator tag may be a radio frequency identification (RFID) tag, and the tag sensor may be a reader configured to interrogate the RFID tag of the torque control accessory to cause a response comprising the tag signal.

Many modifications to the example embodiment provided herein, as well as other example embodiments, will come to mind to one skilled in the art to which these example embodiments pertain having the benefit of the teachings presented in the foregoing descriptions and the associated drawings. Therefore, it is to be understood that the example embodiments are not to be limited to the specific ones disclosed and that modifications and other embodiments are intended to be included within the scope. Moreover, although the foregoing descriptions and the associated drawings describe example embodiments in the context of certain example combinations of elements or functions, it should be appreciated that different combinations of elements or functions may be provided by alternative embodiments without departing from the scope. In this regard, for example, different combinations of elements or functions than those explicitly described above are also contemplated. In cases where advantages, benefits or solutions to problems are described herein, it should be appreciated that such advantages, benefits or solutions may be applicable to some example embodiments, but not necessarily all example embodiments. Thus, any advantages, benefits or solutions described herein should not be thought of as being critical, required, or essential to all embodiments or to that which is claimed herein. Although specific terms are employed herein, they are used in a generic and descriptive sense only and not for purposes of limitation.

That which is claimed:

1. A rotating power tool assembly comprising:

a rotating power tool comprising:

an electric motor;

a spindle;

control circuitry;

an electronic torque limiter operably coupled to the electric motor, the electronic torque limiter being controllable by the control circuity to adjust a maximum torque output to the spindle; and a tag sensor; and a torque control accessory comprising a torque indicator tag and a visible torque value indicia, the torque control accessory being removably attachable to a housing of the rotating power tool, the torque indicator tag being configured to output a tag signal that indicates a maximum torque value associated with the torque control accessory for receipt by the tag sensor, the visible torque value indicia also indicating the maximum torque value;

wherein the tag sensor is configured to read the tag signal from the torque indicator tag for provision to the control circuitry via a sensor signal;

wherein the control circuity is configured to:

determine the maximum torque value based on the sensor signal received from tag sensor; and control the electronic torque limiter to set the maximum torque output to the spindle based on the maximum torque value associated with the torque control accessory, wherein the torque control accessory comprises a sleeve or a boot that is configured to slide onto or over a portion of the housing.

2. The rotating power tool assembly of claim 1, wherein the visible torque value indicia of the torque control accessory comprises a color, wherein the color is associated with the maximum torque value for the torque control accessory.

3. The rotating power tool assembly of claim 2, wherein the visible torque value indicia is positioned to be visible while the rotating power tool is in use to permit the visible torque value indicia to be visible from a minimum distance for visual checks of the torque control accessory.

4. The rotating power tool assembly of claim 1, wherein the torque indicator tag is a wireless communications device that communicates with the tag sensor via wireless communications.

5. The rotating power tool assembly of claim 1, wherein the torque indicator tag is a memory device, a resistor, or a capacitor that communicates with the tag sensor via a physical electrical connection.

6. The rotating power tool assembly of claim 1, wherein the torque indicator tag is a radio frequency identification (RFID) tag; and wherein the tag sensor is a reader configured to interrogate the RFID tag of the torque control accessory to cause a response comprising the tag signal.

7. The rotating power tool assembly of claim 1, wherein the torque limiter comprises:

a torque sensor implemented with a strain gauge or magnetostriction;

a current sensor to measure the motor current; or a slip clutch that is electrically controlled to decouple the spindle from the motor.

8. The rotating power tool assembly of claim 1, further comprising a second torque control accessory comprising a second visible torque value indicia and a second torque indicator tag configured to output a second tag signal that indicates a second maximum torque value associated with the second torque control accessory, wherein the second maximum torque value is different from the maximum torque value, and wherein the second visible torque value indicia is different from visible torque value indicia.

9. A system comprising a plurality of torque control accessories for controlling a rotating power tool to output different maximum torques based on which of the torque control accessories are operably coupled to the rotating power tool, the plurality of torque control accessories comprising a first torque control accessory and a second torque control accessory;

wherein each torque control accessory of the plurality of torque control accessories is configured to be removably attachable to a rotating power tool and communicate a respective maximum torque value to the rotating power tool to cause an adjustment to a maximum torque output from the rotating power tool;

wherein the first torque control accessory comprises a first torque indicator tag and a first visible torque value indicia, the first torque indicator tag being configured to output a first tag signal that indicates a first maximum torque value associated with the first torque control accessory;

wherein the second torque control accessory comprises a second torque indicator tag and a second visible torque value indicia, the second torque indicator tag being configured to output a second tag signal that indicates a second maximum torque value associated with the second torque control accessory;

wherein the first maximum torque value is different from the second maximum torque value, and the first visible torque value indicia is different than the second visible torque value indicia.

10. The system of claim 9, wherein the first visible torque value indicia comprises a first color indicative of the first maximum torque value and the second visible torque value indicia comprises a second color indicative of the second maximum torque value, wherein the first color is different from the second color.

11. The system of claim 10, wherein the first visible torque value indicia is configured to be positioned to be visible while the rotating power tool is in use to permit visibility of the first visible torque value indicia from a minimum distance for visual checks of first torque control accessory.

12. The system of claim 9, wherein the first torque indicator tag is a wireless communications device that communicates with a tag sensor of the rotating power tool via wireless communications.

13. The system of claim 9, wherein the first torque indicator tag is a memory device that communicates with a tag sensor of the rotating power tool via a physical electrical connection.

14. The system of claim 9, wherein the first torque indicator tag is a radio frequency identification (RFID) tag configured to output a response signal indicating the first maximum torque value.

15. The system of claim 9, wherein the first torque control accessory comprises a sleeve or a boot that is configured to slide onto or over a portion of an exterior of the rotating power tool.

16. The system of claim 15, wherein the first torque control accessory comprises a flexible elastomer in the shape of the sleeve or the boot.

17. A rotating power tool assembly comprising:

a rotating power tool comprising:

control circuitry;

an electronic torque limiter configured to be operably coupled to a motor of the rotating power tool, the electronic torque limiter being controllable by the control circuity to adjust a maximum torque output to a spindle; and a tag sensor configured to read a tag signal from a torque indicator tag of a torque control accessory for provision to the control circuitry via a sensor signal, the tag signal comprising an indication of a maximum torque value associated with the torque control accessory;

wherein the rotating power tool is configured to physically, and removably, engage with the torque control accessory;

wherein the control circuity is configured to receive an indication of the maximum torque value from the tag sensor and control the electronic torque limiter to set the maximum torque output to the spindle based on the maximum torque value associated with the torque control accessory;

wherein the torque control accessory further comprises a visible torque value indicia that comprise a color, wherein the color is associated with the maximum value for the torque control accessory.

18. A rotating power tool assembly comprising;

a rotating power tool comprising:

control circuitry:

an electronic torque limiter configured to be operably coupled to a motor of the rotating power tool, the electronic torque limiter being controllable by the control circuity to adjust a maximum torque output to a spindle; and a tag sensor configured to read a tag signal from a torque indicator tag of a torque control accessory for provision to the control circuitry via a sensor signal, the tag signal comprising an indication of a maximum torque value associated with the torque control accessory;

wherein the rotating power tool is configured to physically and removably, engage with the torque control accessory;

wherein the control circuity is configured to receive an indication of the maximum torque value from the tag sensor and control the electronic torque limiter to set the maximum torque output to the spindle based on the maximum torque value associated with the torque control accessory;

wherein the torque indicator tag is a radio frequency identification (RFID) tag; and wherein the tag sensor is a reader configured to interrogate the RFID tag of the torque control accessory to cause a response comprising the tag signal.

* * * * *